United States Patent [19]

Fox et al.

[11] 4,014,005
[45] Mar. 22, 1977

[54] CONFIGURATION AND CONTROL UNIT FOR A HETEROGENEOUS MULTI-SYSTEM

[75] Inventors: Joel Lawrence Fox, Rhinebeck; Eugene Everett Marquardt, Poughkeepsie, both of N.Y.

[73] Assignee: International Business Machines Corporation, Armonk, N.Y.

[22] Filed: Jan. 5, 1976

[21] Appl. No.: 646,698

[52] U.S. Cl. .................................... 340/172.5
[51] Int. Cl.$^2$ .................................... G06F 1/00
[58] Field of Search .................. 340/172.5; 445/1

[56] References Cited
UNITED STATES PATENTS

| | | | |
|---|---|---|---|
| 3,200,380 | 8/1965 | MacDonald et al. | 340/172.5 |
| 3,566,358 | 2/1971 | Hasbrouch | 340/172.5 |
| 3,768,074 | 10/1973 | Sharp et al. | 340/172.5 |
| 3,828,321 | 8/1974 | Wilber et al. | 340/172.5 |
| 3,916,383 | 10/1975 | Malcolm | 340/172.5 |
| R27,703 | 7/1973 | Stafford et al. | 346/172.5 |

*Primary Examiner*—Harvey F. Springborn
*Attorney, Agent, or Firm*—Bernard M. Goldman

[57] ABSTRACT

A configuration and control unit (CACU) is described for a heterogeneous multi-system containing processors which may be of different types, channels, one or more channel crossbar switches which may be of different sizes, various I/O channel switches, I/O control units and I/O devices. The CACU is the focal point in the multi-system for configuration control over all of these system heterogeneous components. The CACU enables the configuration of any switchable part of the entire multi-system to be established and changed at any time due to new processing requirements or failure of part or all of the system.

The CACU contains a parallel wire line (PWL) adapter for providing DC switching control over components connected through channel crossbar switches and/or channel I/O switches. The CACU also has a time multiplexed (TM) adapter connected via serial time multiplexed lines (TML's) to remote modem adapters (RM's) with devices controlled by or switched by the CACU. A TML can provide serial pulse control switching for components connected to channel crossbar and/or channel I/O switches, which transfer data directly from the processor channels whereby the data bypasses the CACU. A TML can also provide serial pulse data to other devices which have their data passed through and switched by the CACU for switchable communication with any processor. A persistent storage unit is providable in the PWL adapter and TM adapter for permanently storing the current configuration of PWL and TML connected units. Upon failure of any one or more units to the PWL adapter or TM adapter, the settings in the persistent storage devices can recover the operating configuration of devices in the multi-system.

5 Claims, 18 Drawing Figures

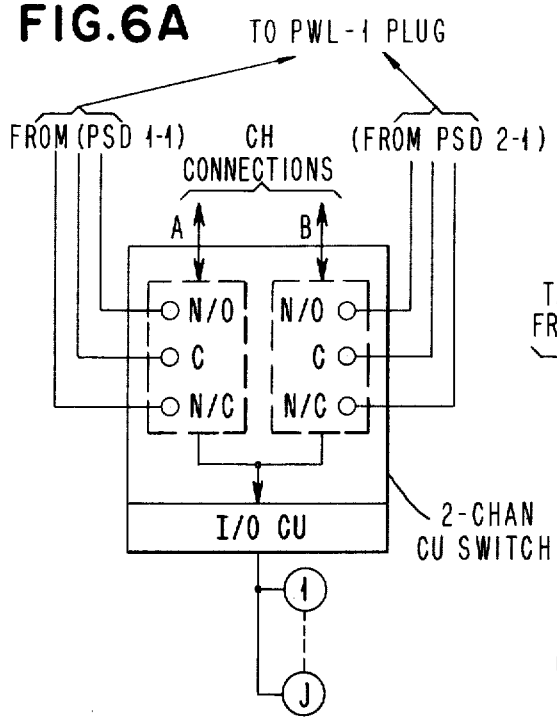
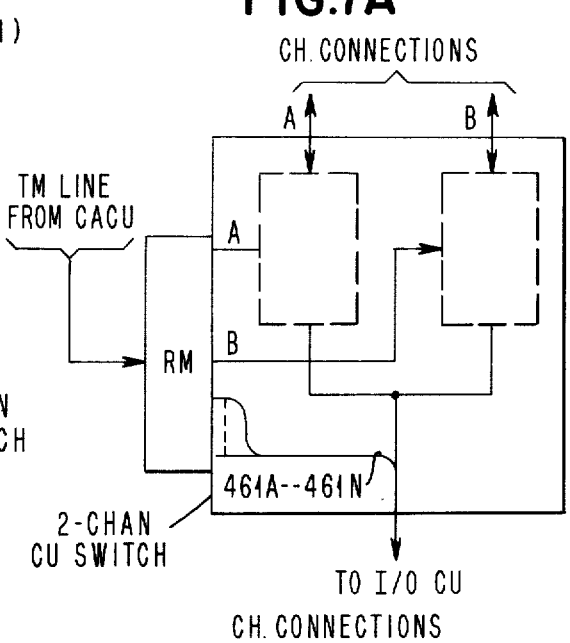
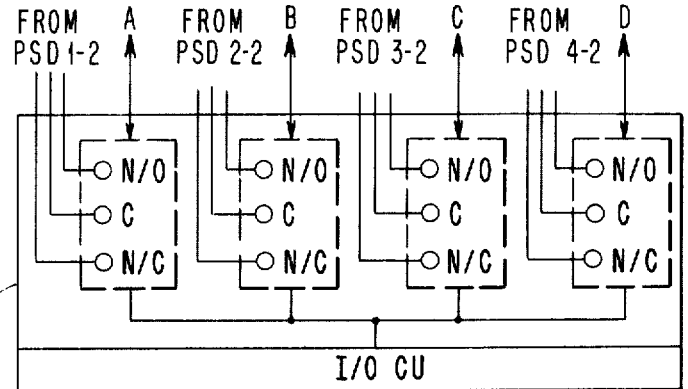
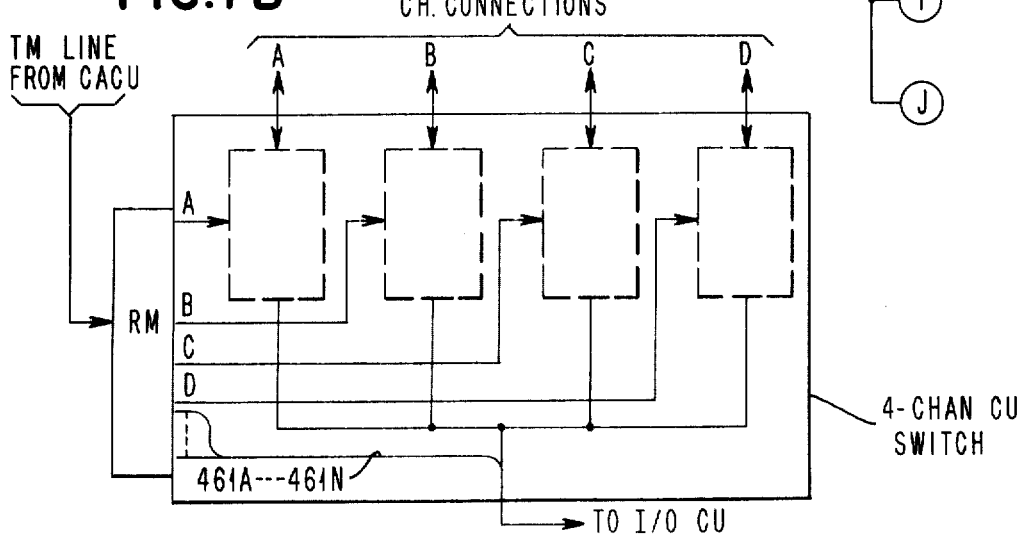

CONFIGURATION AND CONTROL UNIT FOR A HETEROGENEOUS MULTI-SYSTEM

INTRODUCTION

This invention relates to focal point control over the configuration of a heterogeneous data processing multi-system arrangement. That is, the invention provides a single device for controlling the configuration of a multi-system, which can contain heterogeneous processor units, various types of channel cross-bar switches, I/O control unit switches, consoles, service processors, etc.

PRIOR ART

The invention provides initialization and configuration control, rather than only reconfiguration control. That is, the invention can initiate and configure a multi-system for all circumstances, e.g. for most efficiently operating the resources of the multi-system when no unit has failed. Reconfiguration is a subset of configuration operating when a unit has failed. A multi-system is one or more data processing systems loosely or tightly coupled together into a unitary hardware arrangement for meeting an objective requiring their interaction, wherein the respective data processing systems can implement the same or different architectures.

There is a substantial amount of prior art in the area of reconfiguration control for data processing systems, but none has been found which can provide focal point configuration control over all switchable units and devices in a heterogeneous multi-system. Thus, the subject invention provides concentrated configuration control for an entire heterogeneous data processing system arrangement which can be heterogeneous in structure.

Prior art configuration control hardware is not providable as a single unit which can provide total flexibility in controlling the configuration of an entire heterogeneous multi-system arrangement in which there need be no permanent groupings of CPU's and I/O devices, etc. The invention does not require any common bus among its processors (i.e. CPU's) nor does it require any special reconfiguration hardware units between its configuration and control unit (CACU) and the processors as, for example, is found in the U.S.A. Pat. No. 3,812,468 to Wollum et al. Examples of sub-system reconfiguration capability are also found in U.S.A. Pat. Nos. 3,253,262 to Wilenitz, or 3,413,613 to Bahrs et al, or 3,812,468 to Wollum et al.

Furthermore, the invention does not require that any I/O control unit be permanently associated with any particular processor. Thus, the invention is able to cross-couple any I/O control unit to any processor to obtain total flexibility in configuration control within a multi-system. No prior art is known to permit this total configuration capability. For example, U.S. Pat. No. 3,812,468 to Wollum et al cannot cross-couple its I/O control units from one CPU to another but can only eliminate a permanently connected subsystem comprising a CPU and I/O control unit from the multi-system. The invention in this specification does not require or generally desire its processors to be segregated into predetermined subsystems. Furthermore, with the subject invention, there need be no halting of any CPU to configure the multi-system and there need be no loading of any CPU master control program. Thus, the invention does not require a homogeneous system having configuration switching among groups of identical modules is also found in U.S.A. Pat. No. 3,641,505 to Artz et al.

The most widely used way to control system configuration in current commercial systems is to do it under program control as part of the operating system executed from the data processing systems main memory, without any hardware unit dedicated to configuration control. An example is found in U.S.A. Pat. No. 3,200,380 to MacDonald et al which relies on programming to control the configuration obtained by its cross-switching and switch interlock circuits. Similarly, U.S.A. Pat. No. 3,828,321 to Wilber et al provides duplicate copies of a central processor and storage means and uses a program to switch between them, wherein the need for switching is detected by a recovery control circuit.

Program control from a system's main memory suffers from the problem of being unable to restore the configuration whenever the system fails, because current computers have volatile main memories, in which all configuration information is lost, for example, if power is momentarily dropped, or if improper use is made of storage protection and configuration information is incorrectly written over and lost. This invention avoids such problems by providing a hardware entity separate from the system's main memory for permanently storing the current configuration in a non-volatile manner, so that configuration information is not lost regardless of what happens in the data operating systems main memory.

There are many reconfiguration techniques found in the prior art, many of which are highly inefficient. For example, an old technique is a primary CPU and a standby CPU, with a maintenance program in the primary CPU which monitors its operation and upon sensing a failure of the on-line unit, switches its operations to the other CPU. This approach, for example, is found in U.S.A. Pat. Nos. 3,303,474 to Moore et al, or to 3,409,877 to Alterman et al, or 3,562,716 to Fontaine et al, or 3,623,014 to Doelz et al. There are no dedicated primary and secondary units in the subject invention, but all units may be active in a primary sense in the configuration of the multi-system, which can be changed by a configuration and control unit upon a signal from any CPU or any operator console in the entire system, unless it is predetermined that certain CPU's and/or consoles will not have this privilege.

U.S.A. Pat. No. Re.27,703 to Stafford et al discloses a distributed configuration control arrangement wherein each of the processors in the system contains a configuration control register; and all of these registers contain a copy of the same configuration information, so that whenever any processor fails, the system configuration can be restored from the copy in some other processor. However, if a power outage causes failure on all processors, no register may be relied upon for restoring the system configuration existing at the time of the overall power failure. The subject invention does not have distributed configuration control registers with duplicated configuration information in its processors. Instead, the subject invention relies upon persistent non-volatile configuration storage devices which store only a single copy of the current multi-system configuration control data which is available for restoring the multi-system configuration currently existing at the time of any total or partial multi-system failure, including overall power failure. The invention provides multi-system configuration control by providing a separate unit, called a configuration and control unit (CACU), which can be a stand-alone unit, and which is not part of the multi-system processors, or I/O control units. In addition, the CACU periodically checkpoints the multi-system configuration data under control of its configuration and control unit, wherein background configurations control information, such as various predetermined multi-system configuration combinations not currently being used, can be recovered for subsequent use upon a multi-system failure.

OBJECTS, FEATURES AND SUMMARY OF THE INVENTION

It is therefore an object of this invention to provide a configuration and control unit (CACU) for a multi-system which may be heterogeneous, which CACU can control the cross-connections amoung the other multi-system units, such as its processors, I/O control units, consoles, service units, etc.

It is another object of this invention to provide a configuration and control unit which contains non-volatile storage devices that store the currently existing multi-system configuration among predetermined units in the system.

It is another object of this invention to provide non-volatile configuration devices in units connected to the CACU to store current switch connections of such units.

It is another object of this invention to provide a stand-alone CACU for an entire multi-system which can contain persistent configuration storage for switching units controlled by parallel wire lines, wherein the CACU provides switching control for such parallel wire line controlled units.

It is another object of this invention to provide a stand-alone CACU for an entire multi-system which provides configuration control for switching units controlled by time-multiplexed lines, wherein the CACU provides switching control for such time-multiplexed line connected units.

It is another object of this invention to provide a CACU which can communicate time-multiplexed data and switch the data between any processor and any unit having a remote modem adapter designed according to this invention.

It is another object of this invention to provide a CACU which provides switching control for remote units, and can transfer special maintenance data from the remote units to processors to enable processor control over configuring the connections to devices switched by means of the remote units.

It is another object of this invention to provide a CACU which can receive and provide commands for transfer on time multiplex lines to remote units, including commands for the configuration by such respective remote units of devices switched by such units.

It is a further object to this invention to provide a CACU which contains a microprocessor which can respond to commands from any processor in the system by issuing commands to one or more remote switching units in the system to change the configuration of the system for normal operation, or to recover the system to the configuration state existing at the time of a failure within the system.

It is a further object of this invention to provide a CACU with a microprocesor which is interfaced by each processor in the system and by one or more operator consoles from which an operator can control the configuration and request verification of the current system configuration.

It is a further object of this invention to provide a CACU which can store a large number of potential configurations for the overall system and can, upon command from any processor or remote operator console, including the initial IPL (initial program load) configuration, switch the configuration of the overall system or any part thereof, to any of the stored system configurations.

It is a further object of this invention to provide a CACU which can control with any required flexibility and versitility the configuration of a multi-system, even though the multi-system is built from pre-existing CPU's, I/O control units, I/O devices, etc. which may have varying and different architectures.

It is a further object of this invention to provide a CACU for a multi-system which will assist a computer room operator in his work effort of changing the multi-system configurations needed for efficiently performing normal work shift job changes and for existing planned and unplanned maintenance.

It is a further object of this invention to provide a single point in a heterogeneous multi-system which can provide configuration control for the entire multi-system.

It is a further object of this invention to provide a single control point in a multi-system for switching a plurality of channel cross-bar switches and/or a plurality of channel I/O control unit switches in the multi-system.

It is an object of this invention to enable a remote operator console, having a single coaxial wire connection to the CACU, to control the entire system configuration.

It is also an object of this invention to provide a multi-system configuration, subsequent to powering on the system components, so that processor IPL's can be initiated. The first multi-system configuration is provided from the CACU and may be selected by the operator from a previously stored table or may be an operator modified selection from that table or may be generated by the operator prior to IPL of any processor.

It is also an object of this invention to permit an IPL of each processor to be initiated from a central point (i.e. CACU) without the necessity for an operator to depress the IPL pushbutton on every processor.

It is another object of this invention to provide a hardware path from an operator console to every processor through the CACU, which can be used by an operator to monitor the progress and status of the IPL of each processor from a central point, e.g. operator console, even through multiple processors may be IPLing simultaneously or sequentially. In the event of an exception in the IPL operation, correction action can be taken by the CACU or by the operator to continue the IPL.

It is another object of this invention to provide a CACU which enables the easy addition of future channel cross-bar switching units, future channel I/O control unit switches and their connecting devices, future processing units to a multi-system, regardless of the architecture built into such units.

It is a further object of this invention to provide permanent current configuration storage in bistable relay type storage devices providing a form of non-volatile storage.

It is a further object of this invention to provide a CACU having its own floppy disk storage for storing micro-programs to be loaded into its microprocessor storage unit and for recording periodically the content of the microprocessor storage unit with its contained configuration information, in response to signals from a microprocessor checkpoint timing unit in the CACU, whereby the most recently checkpointed copy of the storage unit is available on command from the disk file.

It is another object of this invention to provide a system start-up feature which automatically loads microprograms from the disk unit to the CACU microprocessor store for multi-system start-up.

It is a further object of this invention to provide a CACU containing a microprocessor which contains programs that can automatically vary the system configuration to remove a failing processor or I/O unit or any other unit from the system configuration, upon command from any processor to perform this type of operation.

It is still another object of this invention to provide abnormal maintenance information from outboard units connected to the CACU to any requesting processor or requesting operator console.

The invention provides a stand-alone configuration and control unit (CACU) device in a multi-system for controlling the configuration among the units in the multi-system in response to commands received from an operator console or from a program executing in any processor in the multi-system.

The CACU contains a channel adapter which connects to a channel of each of the processors in the multi-system. The channel adapter connects signals between the channels and a microprocessor in the CACU. The signals from the processors will contain commands to the CACU on how the CACU will control the configuration of the multi-system. The CACU microprocessor with its microprocessor store responds to the received channel commands by sending commands that will switch the appropriate system units. The CACU contains two types of output adapters which are called: (1) an PWL adapter for controlling certain channel switches, and (2) a TM adapter for controlling other types of channel switches. The channel switches switch high data rate devices, such as drums, disks, high speed tapes, etc., and the data to and from such high data rate devices do not pass through from such high data rates devices do not pass through the CACU which only handles their configuration control information. Further, the CACU can also operate as a channel switch and data connection for devices such as terminals, consoles, service processors, tapes, disks, CRT's, and printer devices by having the CACU transfer the data to each such device through its TML adapter. A coaxial cable connects from the TML adapter to a remote modem adapter (RM) with each remote device receiving either switching signals or data.

BRIEF DESCRIPTION OF THE DRAWINGS

FIGS. 6A and 6B respectively illustrate PWL connectable two-channel and four-channel control-unit switches for an I/O control unit.

FIGS. 7A and 7B respectively illustrate a two-channel control unit switch and a four-channel control unit switch having RM adapters.

DETAILED DESCRIPTION OF THE PREFERRED EMBODIMENT

Figure 1:
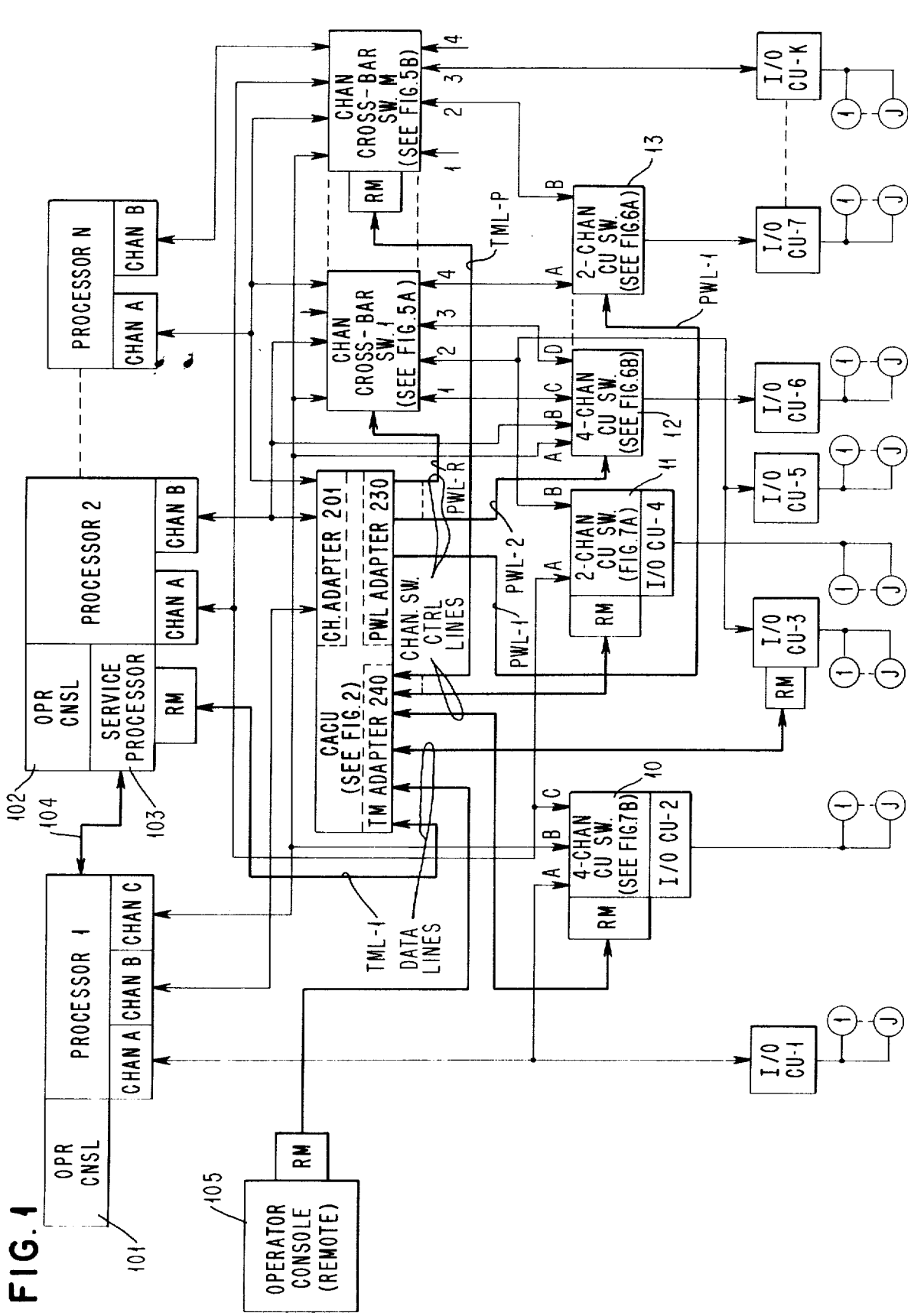
FIG. 1 illustrates an example of a multi-system containing the invention.

FIG. 1 illustrates a multi-system which contains a plurality of processors 1 through N, each having its own set of one or more channels. The processors (i.e. CPU's) need not be identical, and in fact are assumed in this embodiment to be different from each other; these processors may even have different architectures from one another, e.g. one might be an IBM S/370, another an IBM S/3, etc. Processor 1 has channels A, B, and C, processor 2 has channels A and B, and processor N has channels A and B. Processors 1 and 2 have local operator consoles 101 and 102, but processor N is assumed to have no local operator console. Also, processor 2 has a service processor 103 associated with it which also is connected to the processor 1 by line 104.

The CACU (configuration and control unit) is connected to one channel of each processor, so that all processors can communicate system configuration information and commands with the CACU. Also for reliability reasons, two or more channels from any processor, not shown, may be connected to the channel adapter 201 of the CACU, so that the processor can communicate with the CACU if one of its channels fails. Channel adapter 201 is connected to the channel-to-I/O interface of these respective channels, which may be the channel-to-I/O control unit interface commonly found in commercial IBM S/370 systems. The CACU has a unique address, which appears to the processors as an I/O control unit address.

There are also a plurality of channel cross-bar switches 1 through M, which have inputs also connected to channels of the processors. The cross-bar switches need not be uniform in size, e.g. switch 1 has a 3 input by 4 output size, while switch M has a 4 by 4 size; that is, each switch may have any size. Thus, each cross-bar switch may be constructed similarly to an IBM 2914 switching unit, which is commercially available. Thus, the channel inputs of any cross-bar switch can be connected to any of the channels of any of the processors. Each cross-bar switch can connect any of its channel inputs to any of its outputs, which are each connectable in the manner of a channel output, e.g. to an I/O control unit or to a channel control unit switch (which provides mutliple channel input for a control unit). For example, cross-bar switch 1 may convey any of the three channels connected to switch 1 to input C of a four channel control unit switch 12. Similarly, output 2 of switch 1 is connected to both input B of two-channel switch 11 and to I/O control units 3 and 5. Output 3 of cross-bar switch 1 connects to input D of four-channel control unit switch 12, and output 4 of switch 1 connects to input A of two-channel switch 13. Thus, the three channels connected to the inputs of switch 1 can simultaneously be connected respectively to any three of: (1) I/O CU6, (2) one of I/O CU 4, 3 or 5, and (3) I/O CU7. Where a single channel is connected to plural I/O CU's, only one I/O CU can be selected at a given time by the channel which is done by an I/O CU address being provided on that respective channel.

Likewise, any three of the four channels connected to cross-bar switch M can be simultaneously connected to: (1) I/O CU7 via 2-channel CU switch 13, and (2) I/O CU-K. Output 1 of switch M is unconnected and is available for future connection.

The CACU provides two types of output control connections, i.e. parallel wire line (PWL) control outputs from a PWL adapter 230 in the CACU, and time-multiplexed line (TML) outputs from a TM adapter 240. The PWL outputs 1, 2, . . . R are connected to control inputs of channel cross-bar switches, 4-channel control unit switches and 2-channel control unit switches. Thus, in FIG. 1 the control input to cross-bar switch 1 is connected to the PWL-R output of adapter 230, while the control input to cross-bar switch M is connected to the TML-P output of adapter 240. The TML outputs 1, 2, . . . P are respectively connected to remote modem adapters (RM's) attached to the units to be controlled.

CACU SUMMARY

The CACU is connected to each of the processors in the multi-system, from which the CACU can receive configuration and control commands, and data. The CACU provides two types of outputs: (1) PWL adapter outputs, and (2) TM adapter outputs, which connect to units in the multi-system. If a unit is connected to the TM adapter 240, a remote modem adapter (RM) is provided with the unit.

A unit connected to the PWL adapter 230 receives only switching signals, but not data, from the CACU. A unit connected to the TM adapter 240 can receive switching or control signals, or data and can transmit maintenance information to TM adapter 240. High data rate devices can be controlled by PWL adapter 230 or TM adapter 240 by means of channel cross-bar switches, 4-channel CU switches, 2-channel CU switches, etc., which directly receive data and control commands from the channels destined primarily for system I/O devices.

The TM and microprocessor operations in the CACU may limit the rate of data passing through the CACU. Hence, low data rate devices may have their data inputs/outputs directly connected to the TM adapter 240 without any intervening channel switching for such device so that it can communicate with any processor in the multi-system.

Thus, the PWL adapter 230 can only provide configuration switching sigals, but the TM adapter 240 can transfer either configuration, maintenance or control signals, or data to and from the CACU.

Thus the CACU also is, by itself, a unique channel switch for all units receiving their data through the TM adapter 240, since the CACU can switch the data to or from any connected channel to any TM adapter output. In this manner, the CACU can make a data connection between a TML connected outboard device and any processor. For example, remote console 105 can thereby be connected to any processor, as can service processor 103 and local operator console 102.

CACU Details

Figure 2:
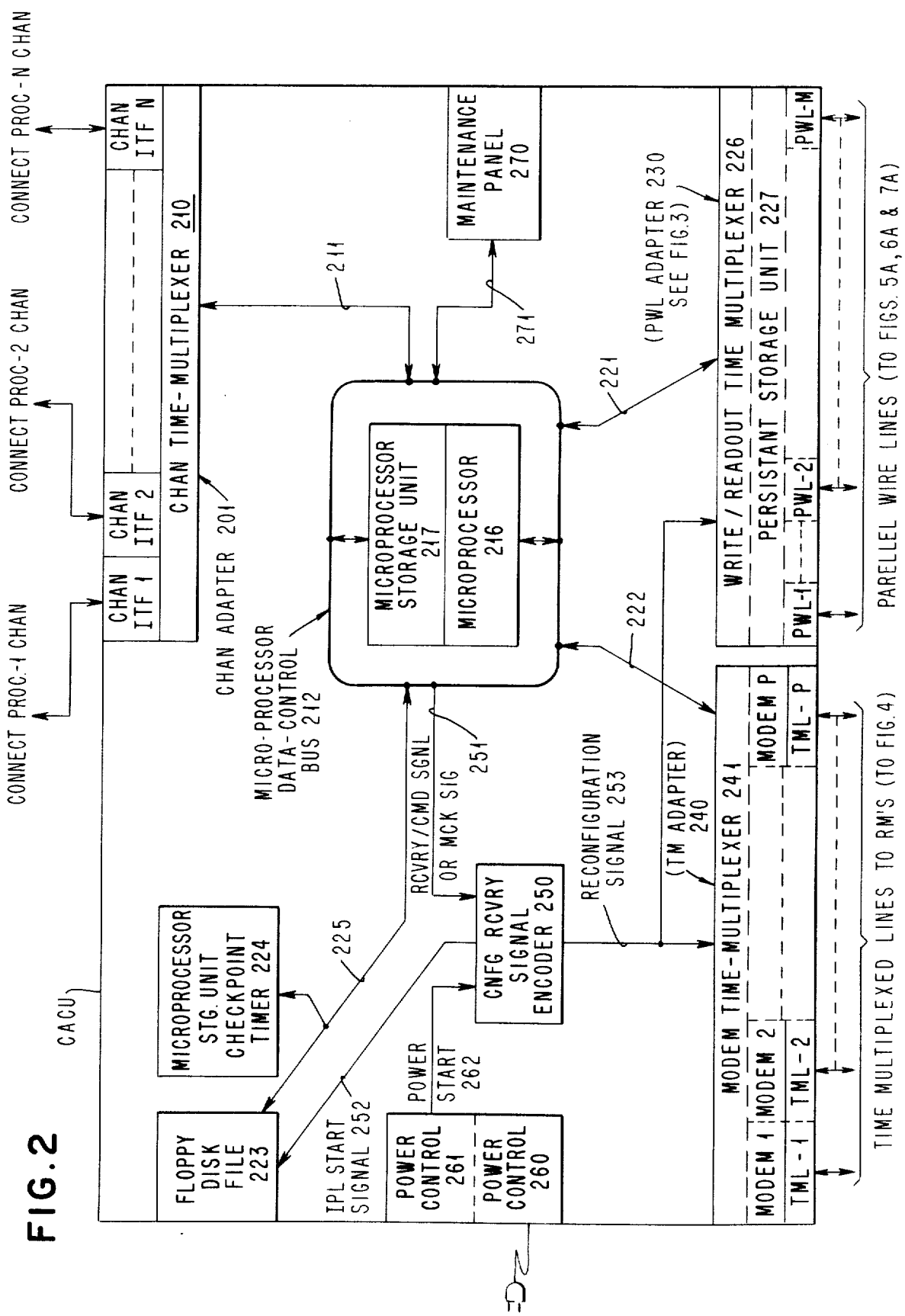
FIG. 2 is an embodiment of the configuration and control unit (CACU) shown in FIG. 1.

FIG. 2 illustrates the CACU embodiment. The CACU includes a channel adapter 201 which comprises a plurality of channel-to-control unit interface connectors, CHAN ITF's 1, 2, . . . N, which can connect the CACU to up to N number of processors via their respective channels. Each channel ITF includes a connector plug to which the control unit end of each channel is connected, in the manner well known in the art. The terminals in each interface plug are connected to inputs of a channel time-multiplexer 210, which is a conventional transmit/receive time-multiplexer which connects the signals of a selected channel to the lines in a bus 211, which is an extension of a microprocessor data and control bus 212 within the data path of mmicroprocessor 216 in the CACU. Bus 212 and all of its extensions are entirely within the CACU. Bus 212 connects all signal-handling components in the CACU to microprocessor 216 and a microprocessor storage unit 217. Thus, PWL adapter 230 is connected via bus extension 221. TM adapter 240 is connected via bus extension 222, a floppy disk file 223 and a checkpoint timer 224 are connected via bus extension 225, a configuration recovery command encoder 240 is connected via bus extension 251, and a CACU maintenance panel 270 is connected via bus extension 271.

Figure 9:
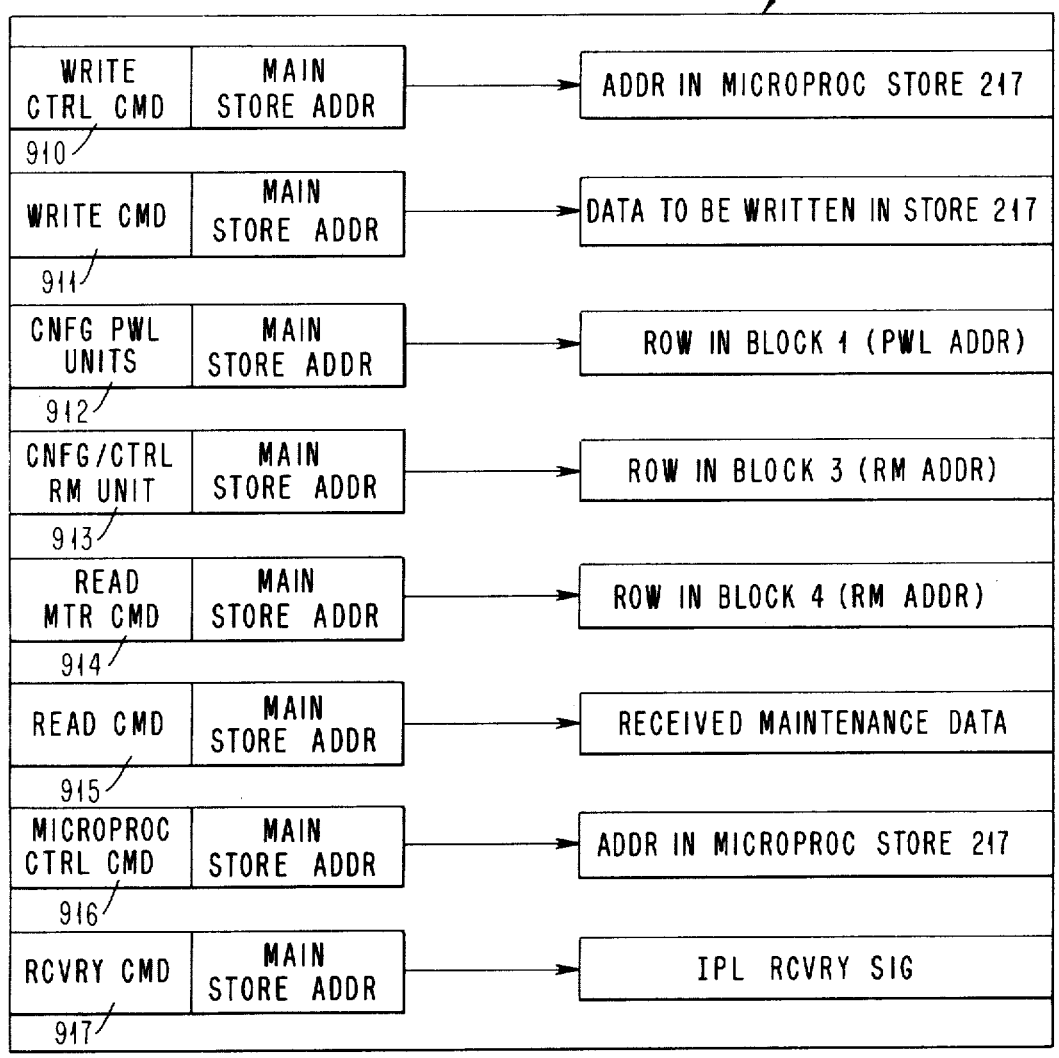
FIG. 9 illustrates processor commands in the processor main store which may be used by any processor in the multi-system to signal to CACU for controlling the configuration of the multisystem, or any configurable part thereof.

Processor control over the CACU is provided by processor commands to the CACU over any CPU channel via channel adapter 201 and bus lines 211 and 212 to the microprocessor 216. The format of these commands is shown in FIG. 9. These CPU commands signal the CACU to perform required switching and control operations in the multi-system shown in FIG. 1.

All devices connected to outputs of the CACU can be configured by any processor, but not all of these devices receive data through the CACU. Any I/O unit connected to an I/O CU 1, 2, . . . K in FIG. 1 could be connected to any processor 1, 2, . . . N within the available connection arrangements shown therein. Thus, processor 1 is data connectable to all I/O devices illustrated in FIG. 1. That is, processor 1 channel A is connectable to I/O CU's 1 and 2. Channel B is control connectable through the CACU TM adapter to I/O CU's 2, 3, 4, 7 and K, and is data connectable to consoles 105 and 102, and to service processor 103. Channel C is data connectable through cross-bar switches 1 and M to I/O CU's 3, 4, 5, 6, 7, and K. Processor 2 is data connectable to devices on I/O CU's 2, 3, 4, 5, 6, 7 and K, consoles 102 and 105, and service processor 103. Likewise, processor N is data connectable through cross-bar switches 1 or M to devices on I/O CU's 3, 4, 5, 6, 7 and K, and consoles 102 and 105, and service processor 103.

As a result of processor commands, the microprocessor provides configuration switch control signals on bus extensions 221 or 222 to PWL adapter 230 or TM adapter 240 to select particular CACU outputs. A selected PWL output provides a D.C. configuration signal to a cross-bar or channel CU switch to control the connections within the switch. A selected TM adapter output communicates a serial set of pulses to a RM, which detects the pulses and provides the signals to any switching unit connected to the RM, (1) to control the connections to channels by the switching unit, (2) to control the transfer of unit maintenance information from the RM to the CACU, (3) to transfer processor data between RM data connected devices and the CACU, or (4) to transmit control signals to I/O control units or processor consoles.

The CACU also has a maintenance panel 270 connected to bus extension 271. The panel is of the conventional type which contains the standard switches and displays used with a processor or microprocessor.

In FIG. 2, floppy disk file 223 has recorded in it the microprograms to be loaded into microprocessor storage unit 217 which are required to operate the microprocessor. Checkpoint timer 224 periodically signals the floppy disk file 223 and the microprocessor via bus extension 225 to record the content of the microprocessor storage unit 217 onto a designated area on the disk, which area may be overlayed during each periodic checkpoint. Thus, the disk will preserve in non-volatile records the multi-system configuration existing at each check point time, in blocks in store 217. Thus, if the multi-system, or any part thereof, fails due to power loss or otherwise, it is possible to recover the system configuration stored at the time of the last checkpoint. However, checkpointed configuration information does not necessarily contain the configuration which exists at the later time of a system failure, since it is possible that configuration changes were made between the time of failure and the last checkpoint operation. Nevertheless, the precise configuration existing at the time of the failure is recoverable from persistent storage unit 227 in the PWL adapter, and from persistent storage unit 427 in the RM in FIG. 4B. The checkpointing will however accurately recover future useable configuration information, i.e. entries in blocks 1 and 3 in FIG. 8.

A configuration recovery signal encoder 250 in the CACU in FIG. 2 can be connected to signal the system to configure to its last commanded configuration upon power startup which causes a signal on line 262 from power control 261, or a recovery command signal on bus extension 251 caused by a processor recovery command 917 such as shown in FIG. 9, or CACU machine check. The encoder 250 provides an IPL start signal to the floppy disk file 223 to restore the content of the microprocessor storage unit 217 to the last checkpointed state. Encoder 250 also provides a reconfiguration signal output on line 253 to PWL adapter 230 and TM adapter 240 to cause restoration of the configuration derived from the current configuration settings in the persistent storage units in the PWL and RM adapter units. For example, the channel switch and cross-bar switch connections may be reinstated during a morning IPL to their state existing at the time of system shut down on a prior day, regardless of the amount of time expiring between the system shut down and the IPL.

TM Adapter 240

The TM adapter 240 in FIG. 2 comprises a plurality of conventional modulator/demodulator units (modems) 1 through P which are connected to bus extension 222 through transmit/receive time-multiplexer 240. These modems are conventional. Also the time multiplexer is conventional; and it converts parallel signals to and from bus extension 222 to serial signals to and from a TML line connected to the selected CACU modem.

PWL Adapter 230 Embodiment

Figure 3:
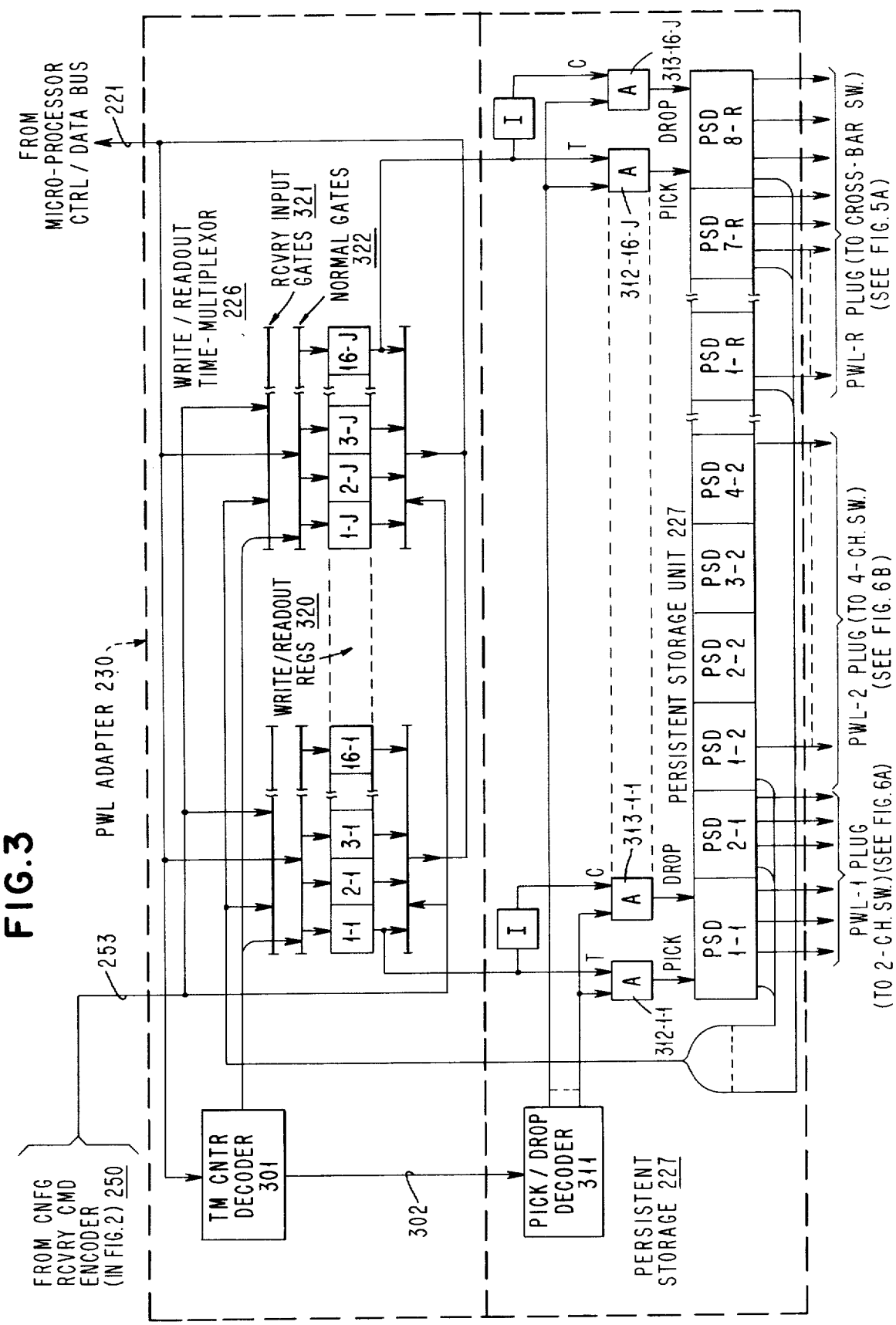
FIG. 3 is an embodiment of the PWL (parallel wire line) adapter found in the CACU in FIG. 2 which has persistent configuration storage.

FIG. 3 illustrates a detailed embodiment for the PWL adapter 230 in the CACU. Adapter 230 contains a plurality of write/readout registers 320, each containing 16 bit positions, which respectively correspond to the 16 data lines on the microprocessor bus extension 221. There are J number of write/readout registers corresponding to J time-slices in the time-multiplexing operation on a single set of PWL configuration data from the microprocessor, which is a single row of bits in table-1 in FIG. 8 which are to be communicated to persistent storage unit 227.

A time-multiplexed (TM) control decoder 301 is connected to the microprocessor bus 221 to control the time-multiplexed ingating to the write/readout registers in the conventional manner of time multiplexers. Thus, decoder 301 may comprise a counter which upon each received bus timing signal steps by 1 to cause the next write/readout register to be ingated, until the counter steps through a full cycle at which time all of the write/readout registers have been engaged with a single PWL configuration. Decoder output line 302 signals the completion of the receipt of the set of configuration data to pick/drop decoder 311 which causes the transfer of the received data in the write/readout registers 320 to be ingated into the persistent storage unit 227. Unit 227 is constructed from any type of non-volatile storage, but in this embodiment it is assumed to be comprised of conventional bistable relays which retain their last setting whenever power is shut off. Thus, each bit in unit 227 will be stored in a respective relay identified as a PSD (persistent storage device). Each PSD is set to a one state by actuation of a pick AND gate 312 or is set to a zero state by a drop AND gate 313 to represent the state of a corresponding bit in the write/readout registers. Each pair of AND gates 312 and 313 thus have inputs connected to the true and complement (via inverter 1) outputs for a single bit position in the set of write/readout registers 320, which bit position reference number is suffixed to the gate reference number. Gates 312 and 313 have another input connected to an output of the pick/drop decoder 311 to time the transfer of bits from the write/readout registers into the persistent storage unit 227. Once the devices in the persistent storage unit 227 are set to a particular state, representing a particular configuration for the PWL devices, that configuration will be continuously signalled by contact closures on the output lines from unit 227 which provide DC outputs.

The bit positions in unit 227 are grouped according to the type of switching unit it controls. Thus, two bit positions are used for a 2-channel switch, such as PSD1-1 and 2-1 in FIG. 3 which are connectable to the 2-channel switch shown in FIG. 6A. Four bit positions are used for a 4-channel switch, such as PSD 1-2, 2-2, 3-2, and 4-2, which are connectable to the 4-channel switch shown in FIG. 6B. Eight bit portions are used for a cross-bar switch, such as PSD 1-R through 8-R, which are connectable to the cross-bar switch shown in FIG. 5A.

Each PSD has multiple outputs, of which one is a feed-back and the others provide N/O, C and N/C signals to the switching unit, such as seen in FIGS. 6A and 6B.

Figure 5:
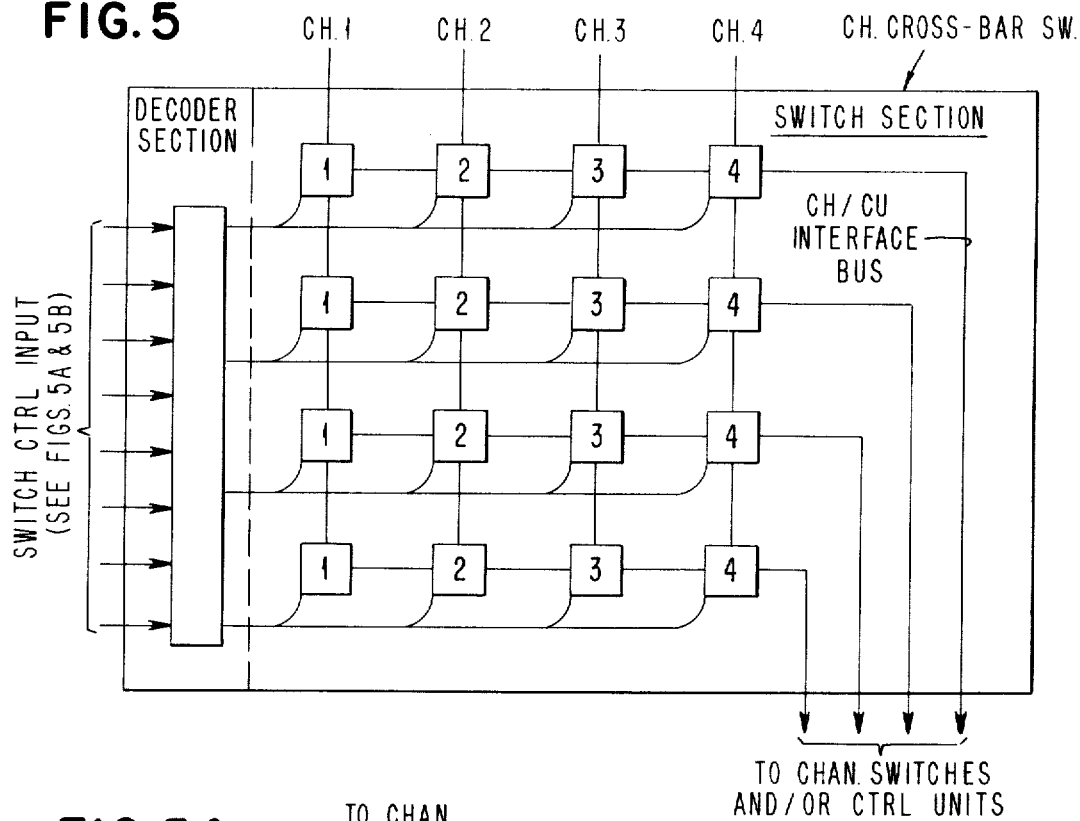
FIG. 5 illustrates the internal form of a conventional channel cross-bar switch of a type which may be used in FIG. 1.
Figure 5A:
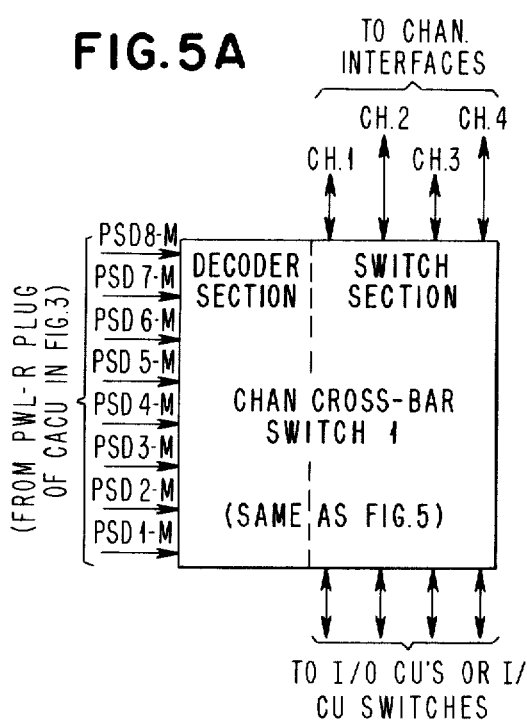
FIG. 5A illustrates the connection of channel cross-bar switch 1 in FIG. 1 to the PWL-R output of the PWL adapter in FIG. 3.

The channel cross-bar switch in FIG. 5 may be constructed identically to the commercially available IBM 2914 cross-bar switch models 1 and 2 with a remote control interface, as explained in IBM publications having form numbers GL22-6937-1, GL22-7025-0 and GL22-6936-1. The decoder 301 is added to receive the control signals from the CACU. FIG. 5A illustrates how channel cross-bar switch 1 in FIG. 1 is connected to the PWL-R output of the CACU illustrated in FIG. 3.

FIGS. 6A and 6B illustrate the two-channel switch and four-channel switch respectively and are connected to the designated PWL plugs in the CACU.

PSD feedback signals are provided to a set of recovery input gates 321 to the corresponding write/readout register bit positions. The recovery input gates are actuated by a reconfiguration signal on line 253 from encoder 250 in the CACU, which causes the volatile write/readout registers 320 to be restored to the existing state found in the persistent storage unit 227.

Remote Modem Adapter (RM) Embodiments

Figure 4A:
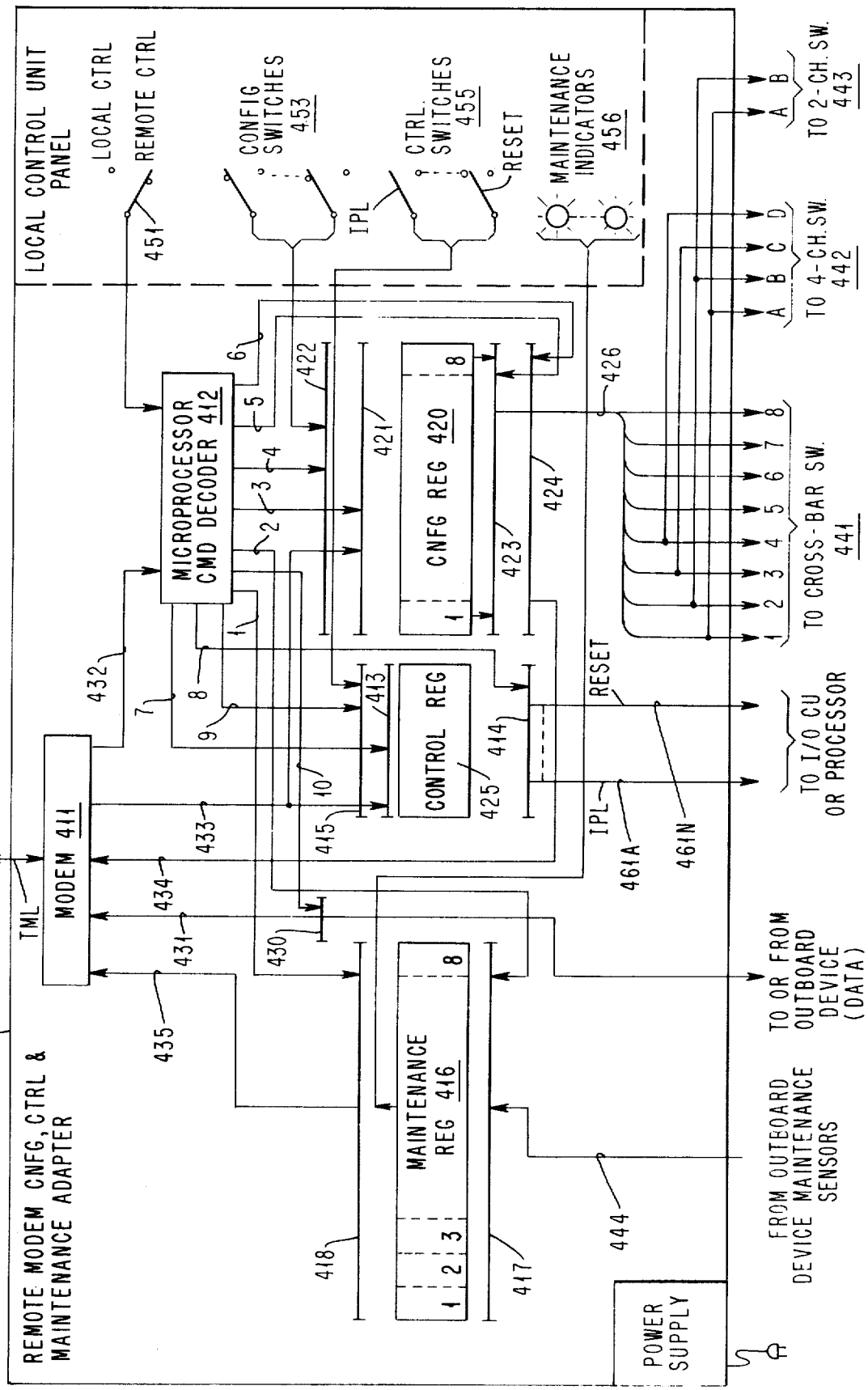
FIG. 4A is an embodiment of a remote modem adapter (RM) which connects to a time multiplexed line (TML) from the TM adapter of the CACU in FIG. 3.
Figure 4B:
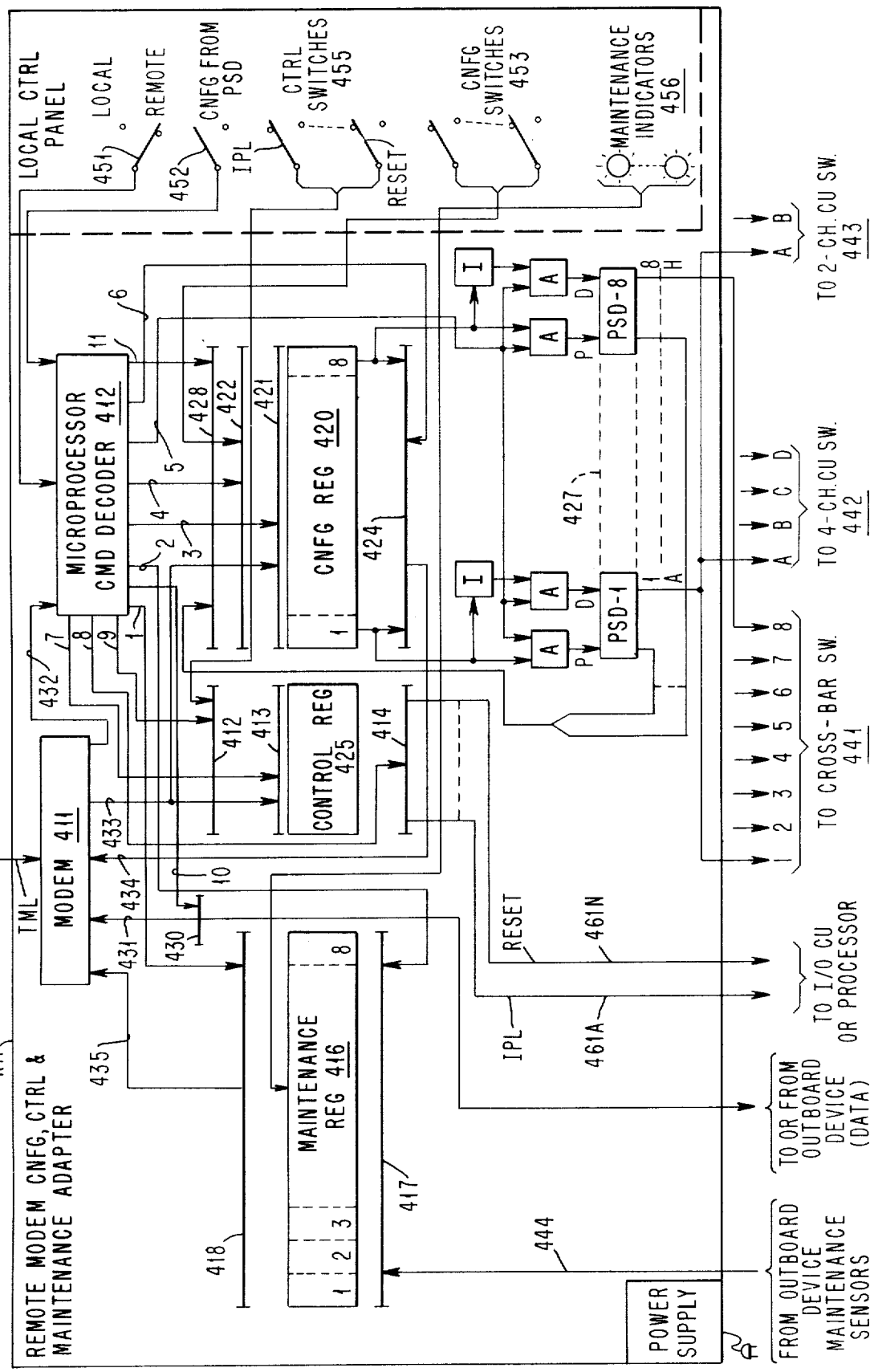
FIG. 4B is another RM embodiment which has persistent configuration storage.

FIGS. 4A and 4B each illustrate an alternate type of remote modem configuration, control and maintenance adapter (RM). A RM is part of each system outboard unit connected to the TM adapter 240 of the CACU.

There is a different basis for a reconfiguration of switching units controlled from the RM shown in FIG. 4B from that in FIG. 4A, which does not have the persistent storage unit 427 found in the RM shown in FIG. 4B.

The RM in FIG. 4A provides reliability in situations where it is powered from a source different from the CACU, so that it is not likely to fail if the CACU power fails. In this case, the current configuration is communicated from the non-failed unit, i.e. CACU or RM, to the other to restore the current system configuration. For example, if the CACU fails and not the RM, the current configuration stored in the RM volatile reigster 420 is transmitted back to the CACU via bus 434 to restore that volatile portion of the configuration. An IPL (Initial program load) of storage unit 217 restores the microprocessor programs and blocks in the form in which they existed at the last checkpoint prior to the stoppage or failure of the CACU.

The volatile configuration stored in register 420 is provided in FIG. 4A in order to support switchable units, when required, such as the connection to the service processor 103 in FIG. 1 which is switchable to processor 1 or 2 even though it is local to processor 2.

Each RM contains a modem 411 which is a conventional modulator/demodulator unit that can transfer data on lines 431 through a bidirectional gate 430 to or from an outboard unit, e.g. control unit, service processor, remote operator station, etc. Modem 411 also has inputs 434, 435 and outputs 432, 433 which go to and come from a maintenance register 416, a control register 425, a configuration register 420 or a microprocessor command decoder 412. Output 431 transfers data to and from certain TML connected units. Output 432 provides command signals to a command decoder 412, which controls the transfers to and from registers 416, 425 and 420 via their respective ingates 417, 415, 413, 422 and 421, and their respective outgates 418, 414, 423 and 424. Additionally in FIG. 4B, an ingate 428 is also provided for register 420 to permit the existing configuration in the PSD 427 to be placed in the configuration register 420. All of the modem inputs and outputs converge in modem 411 into a bus in a conventinal manner.

Figure 10:
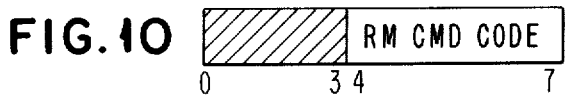
FIG. 10 illustrates the format of remote modem adapter (RM) commands.

An RM command is sent by the microprocessor to a selected RM whenever the microprocessor wishes the RM to perform an operation with regard to the data bus 431 or any register 416, 425 or 420 in the RM. The RM command format is illustrated in FIG. 10, in which the bit positions 4 through 7 contain the RM command operation code.

Decoder 412 contains a clock (not shown) which begins a cycle on each byte received from the modem, except after decoder 412 senses a command code in which case it provides an extra cycle for each of the control commands 1 through 10 in the following RM Command Table and provides two extra cycles after sensing data command 11 in the Table. The coding of the bits 4, 5, 6 and 7 received by command decoder 412 activates decoder outputs 1 – 10 in FIG. 4A and decoder outputs 1 – 11 in FIG. 4B corresponding to the like numbered command codes in the following table:

| CMD NO. | CMD 4 | OP CODE BITS 5 | 6 | 7 | RM OPERATION |
|---|---|---|---|---|---|
| 1 | 0 | 0 | 0 | 1 | Outgate MTR to Modem |
| 2 | 0 | 0 | 1 | 0 | Ingate MTR from I/O CU |
| 3 | 0 | 0 | 1 | 1 | Ingate CNFG from Modem |
| 4 | 0 | 1 | 0 | 0 | Ingate CNFG from panel CNFG Switches |
| 5 | 0 | 1 | 0 | 1 | Outgate CNFG for Channel Switch |
| 6 | 0 | 1 | 1 | 0 | Outgate CNFG to Modem |
| 7 | 0 | 1 | 1 | 1 | Ingate control from Modem |
| 8 | 1 | 0 | 0 | 0 | Outgate control to I/O CU |
| 9 | 1 | 0 | 0 | 1 | Ingate control from Panel Control Switches |
| 10 | 1 | 0 | 1 | 0 | Gate data |
| 11 | 1 | 0 | 1 | 1 | Ingate CNFG from PSD |

Figure 11A:
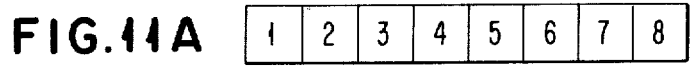
FIGS. 11A, 11B and 11C show formats for an extension to the RM command format illustrated in FIG. 10 for communicating configuration or control signals to an RM from the CACU.

If during an RM cycle, an RM control command 1 – 9 or 11 is sensed, the command is extended during the next cycle by transmission of one byte of configuration, control or maintenance information from block 3 to the RM or from the RM to block 4 as shown in FIGS. 11A, B and C. The configuration or control bit (CNFG/CTRL) in block 3 is not transmitted to the RM. If the data command 10 is sensed, the transmission of the command to the RM is immediately followed by the transmission of two bytes of data between the RM and CACU during the following two cycles (i.e. one byte per cycle).

Output 433 transfers a row of bits received from the CACU which can be either configuration information for a channel switch or control information for an I/O control unit or processor console. A preceding command on line 432 activates line 3 if it is configuration information for register 420 or activates line 7 if it is I/O CU control or processor console control information for register 425. Input 434 transfers the configuration content of register 420 to the modem 411 for transmittal back to the CACU in response to a command 6. Input 435 transfers the content of a maintenance register (MTR) 416 to modem 411 for transmittal to the CACU. Thus Modem 411 can send back to the microprocessor store 217 the content of register 416 or 410 on the command of the microprocessor 216.

Control register 425 is the means by which commands, such as IPL or reset (which normally are initiated by pushbutton on processors or control units), may also be initiated under control of the CACU. When switch 451 is in Local Control position, decoder 412 opens gates 415 and 414 so that the control switches 455 are outputted to the I/O control unit or processor console on lines 461A through 461N. When switch 451 is in remote control position, microprocessor decoder 412 controls the gating of control data from the modem 411 to the control register 425, whereby the same control switch functions can be initiated electronically through a sequence of RM command 7, data, and RM command 8 (see above RM command table) sent to modem 411 from the CACU.

Figure 5B:
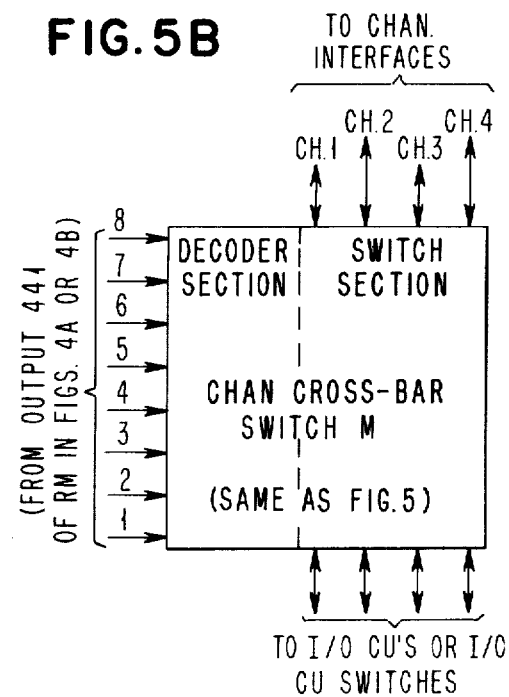
FIG. 5B illustrates the connection of the RM adapter with channel cross-bar switch M in FIG. 1 to the cross-bar switch output 441 in FIG. 4A or 4B.

In FIG. 4A, the switch configuration output is provided by an eight wire output bus 426 which connects the eight outputs from register 420 to each of three RM outputs 441, 442 and 443. The output 441 (which may be a plug) connects to all eight wires in bus 426 and is connectable to a cross-bar switch, such as shown in FIG. 5B. FIG. 5B illustrates the eight input connections of the channel cross-bar switch M to the eight wire output of adapter RM in FIG. 4A or 4B. Output 442 is for a four-channel switch and it is connected to the four wires A, B, C and D in bus 426. Output 442 is connectable to a four-channel CU switch of the type shown in FIG. 7B. Similarly, output 443 is connectable to a two-channel CU switch of the type shown in FIG. 7A. Thus, FIGS. 7A and 7B illustrate how the two-channel CU switch and four-channel CU switch with RM's connect to the TM lines in the CACU and how they are internally laid out. These two-channel and four-channel CU switches may be constructed in the manner of the type commercially available from IBM.

Register 416 receives maintenance information from one or more connected outboard device(s), such as from a control unit, a remote console, or a service processor. The bits in the register represent the status of abnormal conditions such as I/O over-temperatures, I/O machine check, I/O power down, etc., and they are separate from the normal status bits transmitted from an I/O control unit to a conventional data processing system.

A local control panel is also provided in FIG. 4A with the RM. The panel has a plurality of maintenance indicators 456 which respectively indicate the outputs of bit positions in the maintenance register 416. Also, the panel includes a plurality of configuration and control switches 453 and 455, which settings can be put into registers 420 and 425 when a switch 451 is manually set to its local control position which causes decoder 412 to activate its outputs 4 and 9 to condition gates 422 and 415 to ingate the settings of the configuration and control switches 453 and 455.

FIG. 4B adds a persistent storage unit 427 to the basic RM structure shown in FIG. 4A. Unit 427 contains eight persistent storage devices PSD 1-8, which correspond to the eight bit positions in configuration register 420. The persistent storage devices may be of the same type used in the persistent storage unit 227 in the PWL adapter 230 in FIG. 3. In such case, the unit 427 comprises eight bistable relays. Any other non-volatile storage devices may likewise be used for each PSD, such as a ferrite core device.

In FIG. 4B, the RM outputs (which are the same as bus 426 in FIG. 4A) are connected to the PSD outputs of unit 427. Each bit in unit 427 is fed back to respective inputs of register 420 via an ingate 428 in response to modem command 11 in the TABLE above, which can be issued by the CACU whenever the CACU requires the content of volatile register 420 to be reset to the configuration currently stored in PSD unit 427. Then command 6 in the TABLE above can be issued by the CACU to outgate the reset content of register 420 to the modem, which transfers it back to the CACU so that it can reconstruct the system configuration existing at the time of a loss of the content of the volatile microprocessor storage 217, or configuration register 420.

Processor Control of CACU

The CACU is controlled by the processor commands 910 - 917 shown in FIG. 9. These commands can be issued by any of processors 1-N, although if required the system can exclude certain processors by means not part of this invention.

The processor commands used in the embodiment are conventional channel commands tailored to CACU use which have the format discussed in pages 192 to 256 in a prior publication entitled "IBM System/370 Principles of Operation" (Form No. GA22-7000-3). In this regard write command 911 and read command 915 shown in FIG. 9 may be the S/370 write and read commands described in that publication, while all of the other commands in FIG. 9 can be S/370 control commands distinguished by different modifier bits in the command code of the type described in that publication. Only bits 0-31 of the commands are shown in FIG. 9, since bits 32-63 have the conventional flag and byte count field defined in this prior publication.

Figure 8:
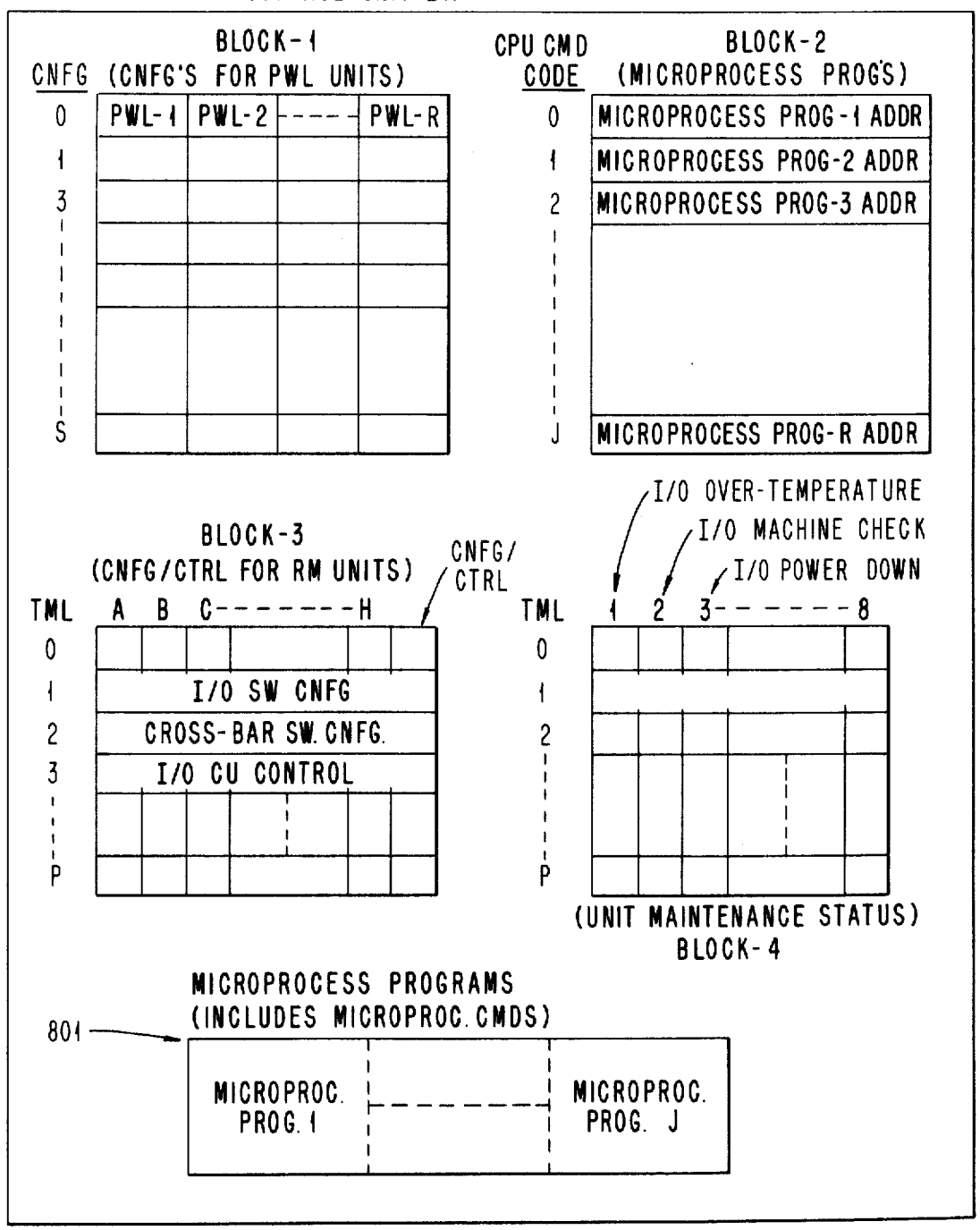
FIG. 8 illustrates a microprocessor storage map of blocks and microprocessor programs used in the operation of the CACU.

The processor commands control the microprocessor 216, which then controls blocks and programs in the microprocessor store 217 illustrated in FIG. 8. The microprograms and blocks may be placed in the microprocessor storage unit 217 by initial program loading (IPL) of unit 217 from the disk file 223. The hardware in time-multiplexers 210, 226 and 241 in FIG. 2 and the microprocessor programs 801 in FIG. 8 control transfers of control signals and data through the CACU, buffered in blocks 1 and 3 in store 217 as shown in FIG.. 8. These microprocessor programs are initiated by the command signals transmitted from any processor via its channel connected to an ITF plug of the CACU. Each processor command in FIG. 9 has an address in the processors' main store 901, at which is found an address in the microprocessor store 217. When issued, the processor command activates conventional channel lines to its ITF plug.

The write control command 910 followed by a write command 911 are used together by any processor to construct or modify any of the blocks or microprograms shown in FIG. 8, or two write into any other field in microprocessor store 217. Write control command 910 is executed by the processor accessing the addressed location in the CPU's main store 901 shown in FIG. 9 and transmitting its content as a control signal to the ITF plug for that processor.

The control signal generated by the command code in any of commands 910 – 917 is sent to the microprocessor 216 from that ITF plug as an address, which activates an executive microprogram in store 217 that uses the control signal to access a row in block 2 to start a microprogram corresponding to the received processor command. For example the signals provided by the processor write control command 910 dispatch a write program in microprocessor store 217, which is then executed by the microprocessor to write the received data at the location specified. In this manner, the data transmitted from the CPU main store address in the following write command 911 is put into the microstore address transmitted by the write control command 910.

The rows in block 2 in FIG. 8 thus contain addresses to entry points in microprograms 801 in storage unit 217.

Each row (CNFG) in block 1 in FIG. 8 can be set to a particular configuration for the PWL units, and its different rows then store different available PWL unit configurations. Thus, a row with a required configuration is chosen by transferring the content of that row in block 1 to the persistent storage unit 227 in FIG. 2; this is done by a processor issuing the "configure PWL units" control command 912 in FIG. 9. Command 912 transfers from the processor main store 901 the address of the required row in block 1 in microprocessor store 217. Then the row contents are transferred to persistent storage unit 227 in FIG. 2 via bus 212 and bus extension 221. The PWL unit configuration is changed by selecting and transferring another row of block 1 which contains the next required configuration. Block 1 is initially set up and can be later changed by means of command 910 and 911 for all switchable configurations for the PWL system. Further, if any PWL units configuration is not found in block 1, a new configuration can at a later time be entered into a selected row in block 1 by use of the commands 910 and 911. Thus there are S number of different PWL configurations which can be predetermined in block 1.

Figure 11B:
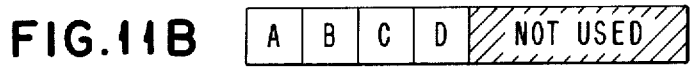
Figure 11C:
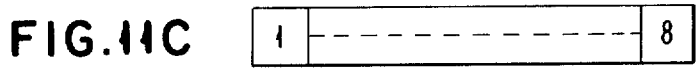

Similarly, the "Configure or control RM units" command 913 is used to obtain any RM units configuration or control requirement in which the main store address of command 913 contains the address of a row in block 3 in store 217. The rows in block 3 contain either a RM cross-bar switch configuration signal (FIG. 11A), or a RM I/O switch configuration signal (FIG. 11B) for a specified RM, or a control signal to the RM's corresponding to the respective rows. The channel signals issued for the command codes are interpreted by microprocessor 216 in the conventional way to initiate respective microprograms. This is done by the microprocessor using the channel command code signals to access respective rows in block 2 to initiate microprograms selected therefrom.

The channel signals issued for the command codes of the "Configure or control RM units" command 913 and "read MTR" command 914 access the rows in block 2 to initiate execution of the microprograms which reads rows from blocks 1 and 3.

A microprocessor command of the type shown in FIG. 10 is issued by the microprogram selected Configure or control RM units command 913 from the CPU (microprogram) to select a particular configuration/control word in microstore 217 for a selected RM which is to have its units configured or have a control signal as a result of the execution of (issued by a) command 913. (which is the) The proper RM is specified by the address in a selected row in block 3.

The "read MTR" command 914 from a processor signals the microprocessor to execute a microprogram that issues command 1 in the MICROPROCESSOR COMMAND TABLE specified previously herein, wherein command 1 outgates the content of the RM maintenance (MTR) register 416 on its TML to the microprocessor which puts it into the RM's TML index in block 4. Then a processor issues a "read MTR" command 914 followed by a read command 915, by which the channel transmits to the CACU the TML index for the required status in block 4. The CACU responds by accessing that TML index in block 4 and transmitting the maintenance data to the main store location in read command 915. In this manner, outboard maintenance status is put in block 4 and then transferred back to the processor main store under the control of any processor.

Recovery command 917 is utilized by any processor after any suspected failure in the multisystem. Command 917 signals the CACU to IPL and recover the last specified multisystem configuration by reloading the microprocessor store 217 with the last check-pointed version of the blocks and programs stored on floppy disk 223, and then the microprocessor issues microprocessor commands to the configuration entries in blocks 1 and 3 from the existing settings in the PSD units 227 in the PWL adapter, and from PSD units 427 in the RM adapters. Thus, the current CNFG entry in block 1 is reset by a command to recovery encoder 250 in FIG. 2, and entries in block 3 are restored by scanning all RM's using microprocessor commands 10 and 6 on each RM. A completion signal is posted in the main store address for command 917 when the check-point recovery is completed. Block 4 is restored by a processor issuing "read MTR" command 914 and read command 915 for each TML.

Multiplexed Operations in CACU

Each processor is connected to a different ITF plug in the channel adapter 201 of the CACU in FIG. 2. Therefore, the CACU identifies a particular processor by means of its unique ITF plug.

The channel time-multiplexer 210, in FIG. 2 is conventional.

Any processor can get itself connected to the CACU by issuing a select instruction, such as an IBM S/360 Start I/O instruction (SIO) in which the CACU is addressed by a unique address in the control unit field of the instruction. The connection is then made between the CACU and the processor [if the CACU is not busy, i.e. not presently connected to some other processor (or process)], in the conventional manner that processor to control unit connections are made on conventional data processing systems. If the CACU is busy, the processor may do something else, and at a later time it reissues the SIO instruction until it finds the CACU is not busy and the connection is made. Once the processor is connected, it transmits its commands and/or data to the CACU, and they are performed or transmitted by the CACU to its addressed outboard unit(s). When the processor stops the transmission or interrupts its transmission beyond a predetermined time period, the connection is broken, and the CACU becomes non-busy and thereby is selectable by any processor which thereafter issues a SIO instruction for the CACU.

If the processor transmits control information for a CACU controlled crossbar or CU channel switch, the CACU sets up the channel switch for the required I/O connections and disconnects from the processor. Then all subsequent transfers between the connected devices and the processor bypass the CACU, which is free to service other processors.

In this manner, the data of any processor can be transmitted to or from any data RM. Thus, the CACU can switch any processor to any data RM by merely connecting any processor to any RM.

A human operator at a console connected through the RM adapter 240 can therefore control the console's connection to any processor in order to send or receive messages from any processor. This is done by the operator typing a command in the conventional manner at the console, which is sent to any processor currently connected to the console. The console's command identifies any processor to which the console requests are to be connected. The CACU makes the connection between the console and the requested processor.

For example, assume a console has a data RM connected to TML-2, which is currently connected to processor N. Hence, the console currently communicates only with processor N. Suppose the human operator types in a command, e.g. "CONNECT TML-2 to ITF 1" which requests the console be connected to processor 1. This command is received by the CACU which establishes a connection between the console and the requested processor 1. In this manner, the console is switched to processor 1, which is now the only processor which can receive and transmit messages to and from the console. In this manner, the console can be connected to any processor at the console's request.

Further, a console can switch another console or device among the processors using this same technique. Also, it is apparent that any processor can switch any RM connected console from any other processor to itself, or from itself to any other processor, without receiving any request from any console.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system configuration and control unit (CACU) for a combination of: one or more CPU's, a plurality of I/O devices and/or device switches, and one or more operator stations; each CPU having one or more data channels; the CACU being capable of configuring one or more data channels; the CACU being capable of configuring one or more data processing systems (DPS) from the one or more CPU's, the channels, the I/O devices and/or the device switches, and the one or more operator stations, the CACU comprising:

a random access storage unit having a first location for storing a first bit pattern for a current configuration of the DPS and having a second location for storing a second bit pattern for a next configuration of the DPS, a processor unit coupled to the random access storage unit, a configuration storage unit containing a plurality of persistent bistable devices, and a write/readout unit connecting the persistent bistable devices to the processor unit, channel adapter means for connecting the processor to each CPU includable in the DPS through a respective channel, and means for transmitting the state of a subgroup of the persistent bistable elements in the configuration storage unit to a respective I/O device or device switch in order to control the connections of the respective I/O devices or device switches into the data processing system.

2. A CACU as defined in claim 1 further comprising reconfiguration signal sensing means in the CACU for receiving a reconfiguration-request signal from one of the CPU's or from an operator console, reconfiguration signal response means acting in response to the sensing means to force the processor to read the settings in the second location and correspondingly reconfigure the DPS.

3. A multi-system configuration and control unit (CACU) for a combination of: one or more CPU's, a plurality of I/O devices, and one or more operator stations; each CPU having one or more data channels; the CACU being capable of configuring a multi-system (MS) from the CPU's, the channels, the I/O devices, and the one or more operator stations, the CACU comprising:

a random access storage unit having a first location for storing a first bit pattern for a current configuration of the MS, and having a second location for storing a second bit pattern for a next configuration of the DPS, a processor unit coupled to the random access storage unit, a configuration storage unit containing a plurality of persistent bistable devices, and a write/readable unit connecting the persistent bistable devices to the processor unit, a subgroup of the persistent bistable elements being settable to the state in the first location in the random access storage unit to represent a current configuration of the multi-system, channel adapter means for connecting the processor to each CPU includable in the MS through a respective channel, means for transmitting the state of the subgroup of the persistent bistable elements in the configuration storage unit to a respective I/O device in order to control the signal routing of the respective I/O devices to selected CPU's in the data processing system, and configuration-recovery means in the CACU being actuated by a recovery command signal from any CPU, or from an internal CACU power-start signal, or from a CACU machine check recovery signal to actuate the write/readout unit to transfer the settings in the subgroup of persistent bistable elements to the first location in the random access storage unit.

4. A configuration and control unit (CACU) for a combination of: CPU's, a plurality of I/O devices, and one or more operator stations; each CPU having one or more data channels; the CACU being capable of configuring a multi-system (MS) from the CPU's and their channels, the I/O devices, and the one or more operator stations, the CACU comprising, a random access storage unit having a first location for storing a first bit pattern for a current MS configuration and having a plurality of second locations for storing respective bit patterns for other selectable MS configurations, a processor unit coupled to the random access storage unit, a configuration storage unit containing a plurality of persistent bistable devices, and a write/readout unit connecting the configuration storage unit to the processor unit, a subgroup of the persistent bistable elements being settable to the state in the first location in the random access storage unit to represent a current configuration of the multi-system, channel adapter means for connecting the processor to each CPU includable in the MS through a respective channel, means for transmitting the state of the subgroup of persistent bistable elements in the configuration storage unit to a respective I/O device in order to control the signal routing of the respective I/O devices to selected CPU's in the MS, and said processor having means for selecting and setting any of the second locations in the random access memory to a set of future configuration signals received from a CPU or from an operator console, whereby a subsequent reconfiguration signal from a CPU actuates the processor to reconfigure the multi-system to a form represented by the setting in a selected one of the second locations.

5. A configuration and control unit (CACU) for a combination of: CPU's, a plurality of I/O devices and one or more operator stations; each CPU having one or more data channels; the CACU being capable of configuring a multi-system (MS) from the CPU's, the I/O devices, the one or more operator stations, and the channels, the CACU comprising:

a random access storage unit having a first location for storing a first bit pattern for a current configuration of the MS and having a plurality of second locations for storing respective bit patterns for respective reconfiguration of the MS, a processor unit coupled to the random access storage unit, a configuration storage unit containing a plurality of persistent bistable devices, and a write/readout unit connecting the configuration storage unit to the processor unit, channel adapter means for connecting the processor to one or more channels of each CPU includable in the MS, means for transmitting the state of a subgroup of persistent bistable elements in the configuration storage unit to a respective I/O device in order to control the connections of the respective I/O devices into the data processing system, said processor having means for decoding a received command signal from any CPU or operator station for changing one of the second locations to a new first location in order to cause one or more I/O devices to be connected to disconnected from any CPU, and means for transmitting the setting in the new first location to a subgroup of persistent bistable devices in the CACU to modify the I/O device configuration in the MS in accordance with the command signal from a CPU or from an operator station.

* * * * *